US009219361B1

(12) United States Patent
Wine et al.

(10) Patent No.: US 9,219,361 B1
(45) Date of Patent: Dec. 22, 2015

(54) METHODS, DEVICES, AND MEDIUMS ASSOCIATED WITH POWER MANAGEMENT OF ELECTRICAL DEVICES

(75) Inventors: David William Wine, Seattle, WA (US); Andrew Konstantaras, Seattle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 285 days.

(21) Appl. No.: 13/362,640

(22) Filed: Jan. 31, 2012

(51) Int. Cl.
*G08B 21/00* (2006.01)
*H02H 11/00* (2006.01)
*H01R 13/703* (2006.01)

(52) U.S. Cl.
CPC ........... *H02H 11/00* (2013.01); *H01R 13/7036* (2013.01)

(58) Field of Classification Search
CPC .. H02J 3/14; H02J 2003/143; Y02B 70/3283; Y04S 20/222
USPC .......................................................... 340/657
See application file for complete search history.

(56) References Cited

U.S. PATENT DOCUMENTS

| | | | | |
|---|---|---|---|---|
| 5,689,242 | A * | 11/1997 | Sims et al. | 340/652 |
| 2002/0024332 | A1* | 2/2002 | Gardner | 324/103 R |
| 2002/0101695 | A1* | 8/2002 | Saksa | 361/64 |
| 2002/0169914 | A1* | 11/2002 | Shteyn | 710/305 |
| 2006/0120008 | A1* | 6/2006 | Kreiner | 361/211 |
| 2007/0083294 | A1* | 4/2007 | Bruno | 700/295 |
| 2009/0079416 | A1 | 3/2009 | Vinden et al. | |
| 2009/0100153 | A1* | 4/2009 | Ebrom et al. | 709/219 |
| 2010/0007334 | A1* | 1/2010 | Apfel | 324/123 R |
| 2010/0287489 | A1* | 11/2010 | Alles | 715/772 |
| 2011/0053410 | A1* | 3/2011 | Namiki et al. | 439/518 |
| 2011/0196547 | A1* | 8/2011 | Park et al. | 700/296 |
| 2012/0092811 | A1* | 4/2012 | Chapel et al. | 361/622 |
| 2012/0095610 | A1* | 4/2012 | Chapel et al. | 700/297 |
| 2012/0150359 | A1* | 6/2012 | Westergaard | 700/291 |
| 2012/0217928 | A1* | 8/2012 | Kulidjian et al. | 320/109 |
| 2013/0110296 | A1* | 5/2013 | Khoo et al. | 700/286 |
| 2014/0025221 | A1* | 1/2014 | Chapel et al. | 700/296 |
| 2014/0032003 | A1* | 1/2014 | Chapel et al. | 700/295 |

OTHER PUBLICATIONS

TALKINGplug Inc.; "Appliance-Level Control and Measurement of Energy Consumption"; 2010; 4 pages; http://www.talkingplug.com/images/uploads/TALKING_plug_sell_sheet_2010.pdf (website accessed Oct. 10, 2011).
TALKINGplug Inc.; "Make Every Plug Talk"; 2010; 6 pages; http://www.talkingplug.com/images/uploads/make_every_plug_talk_2010.pdf (website accessed Oct. 10, 2011).

* cited by examiner

*Primary Examiner* — Julie Lieu
(74) *Attorney, Agent, or Firm* — Schwabe Williamson & Wyatt P.C.

(57) ABSTRACT

An apparatus may comprise a first controller configured to identify a power requirement associated with an electrical device, and a transmitter configured to communicate the power requirement to a second controller. The second controller may be associated with an electrical circuit configured to provide power to a plurality of electrical devices including the electrical device. Additionally, the apparatus may comprise a receiver configured to receive a response from the second controller. The response may identify an available power associated with the electrical circuit, and the first controller may be configured to enable operation of the electrical device based, at least in part, on a comparison of the power requirement and the available power.

23 Claims, 6 Drawing Sheets

METHODS, DEVICES, AND MEDIUMS ASSOCIATED WITH POWER MANAGEMENT OF ELECTRICAL DEVICES

BACKGROUND

Known power management systems may include a circuit breaker box or a fuse box that may be connected to a plurality of electrical outlets. The plurality of electrical outlets may be divided into one or more circuits, and each circuit may be associated with separate circuit breaker or a separate fuse. A plurality of devices may be plugged into the electrical outlets. When a power draw associated with the plurality of devices exceeds a maximum allowable power rating for the circuit, the known power management system may cause the circuit to open, such as when a circuit breaker trips or a fuse blows. When the circuit is open, the circuit breaker may need to be reset or the fuse may need to be replaced, which may be an inconvenience to device users.

The circuit breaker box or the fuse box of the known power management systems may be configured in anticipation of which electrical outlets may be associated with devices having a relatively high power draw, such as a laundry machine, an oven, or a hair dryer. Circuit breakers or fuses having a higher maximum power rating may be used for electrical outlets associated with the high-power rated devices. Nevertheless, an unexpected number and/or type of devices that are connected to the known power management system may cause the associated circuit to open, which may result in a loss of power to the devices connected to the circuit.

DETAILED DESCRIPTION

Figure 1:
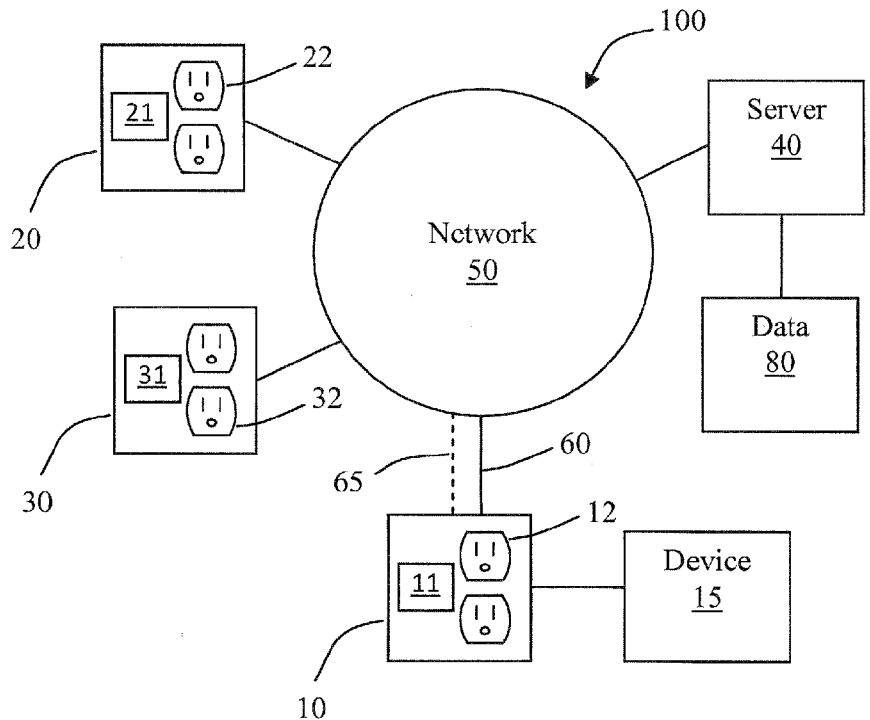
FIG. 1 depicts an example of a system associated with monitoring and/or managing power usage.

FIG. 1 depicts an example of a system 100 associated with monitoring and/or managing power usage. A plurality of controllers, including a first controller 10, a second controller 20, and/or a third controller 30 may be operatively coupled to network 50. First controller 10 may comprise a processing device 11. In some embodiments, first controller 10 may comprise, may be connected with, and/or may be associated with, one or more outlets, such as outlet 12. Second controller 20 may comprise a processing device 21 and/or one or more outlets, such as outlet 22. Similarly, third controller 30 may comprise a processing device 31 and/or one or more outlets, such as outlet 32.

First controller 10, second controller 20, and/or third controller 30 may be associated with one or more devices, such as a device 15. First controller 10 may be configured to transmit and/or provide power to device 15, which may comprise an electric device and/or an electronic device. In one example, the plurality of controllers 10, 20, 30 may comprise one or more electrical outlets. Additionally, a server 40 may be operatively connected to network 50.

Network 50 may comprise a public network and/or a private network established for personal use, business use, governmental use, or any combination thereof. For example, network 50 may comprise a cable network, a satellite network, a cellular network, a telephone network, a broadband network, a voice over Internet Protocol (VoIP) network, or any combination thereof. Furthermore, network 50 may comprise an electrical network, a wired network, a wireless network, a local area network, a wide area network, the Internet, a virtual network, or any combination thereof.

In some examples, network 50 may comprise a power line 60 and/or a communication line 65. Power line 60 may be configured to supply power to one or more of the plurality of controllers 10, 20, 30 and/or devices, such as device 15. Communication line 65 may be configured to provide communication to, from, and/or between, the plurality of controllers 10, 20, 30 and/or server 40. In one example, power line 60 may be configured to provide communication to, from, and/or between, the plurality of controllers 10, 20, 30 and/or server 40.

An electrical circuit may be rated as 15 amps at 110 volts, or 1650 watts. Power usage above a maximum rated power of 1650 watts may cause a circuit breaker to trip or a fuse to blow, without providing any indication in advance. Relative to some electronic devices, 1650 watts may provide sufficient power for many types of applications and/or devices. However, certain devices, such as a hair dryer or a vacuum cleaner, and particularly in combination with each other, may quickly exceed the maximum rated power. Some electrical circuits may be designed with a capacity which greatly exceeds normal usage in order to avoid the circuit breaker from tripping or the fuse from blowing.

An electrical circuit architecture associated with a building may be relatively fixed at the time of construction, inhibiting the opportunity to change usage patterns within the building over time. For example, a building floor may initially be designed to accommodate office space, and then later be retrofitted as a laboratory. This retrofitting of the electrical circuit architecture may be expensive and time consuming, and may involve the removal and/or installation of the electrical outlets.

Power is often billed on a per-building basis. Once the electricity is metered into the building, it may be difficult to determine or apportion an amount of the electricity that should be billed to each user and/or tenant. For users that consume relatively small amounts of energy at low rates, a discrepancy in electricity usage and associated costs may be acceptable; however, as electric vehicles become more prevalent in society, the costs associated with charging the vehicles on a daily basis may result in greater discrepancies and/or inconsistent allocations of the costs of providing electricity.

First controller 10 may be configured to store information associated with device 15. The stored information may comprise subscription information, a device identification, a user identification, a power consumption rating, a power usage history, a duration of use, a power usage profile, information associated with operation of device 15 and/or other devices, or any combination thereof. Additionally, first controller 10 may be configured to receive substantially real-time operational data associated with device 15 and/or to communicate with one or both of device 15 and server 40.

In one example, first controller 10 may be configured to identify a power requirement associated with an electrical device, such as device 15, which may be operatively connected to first controller 10. First controller 10 may be configured to communicate the power requirement to one or more other controllers, such as second controller 20, third controller 30, server 40, or any combination thereof. One or more of first controller 10, second controller 20, and third controller 30 may be associated with an electrical circuit configured to provide power to a plurality of electrical devices, including device 15.

First controller 10 may be configured to receive a response from second controller 20, third controller 30, and/or server 40, and the response may identify an available power associated with the electrical circuit. Additionally, first controller 10 may be configured to compare the power requirement to the available power, and/or to enable operation of the device 15 as a result of the comparing.

Server 40 may be configured to perform some or all of the operations described above with respect to first controller 10, second controller 20, and/or third controller 30. A database 80 associated with server 40 may be configured to store information, such as subscription information, a device identification, a user identification, a power consumption rating, a power usage history, a power usage profile, information associated with operation of device 15 and/or other devices, information associated with first controller 10, second controller 20, and/or third controller 30, or any combination thereof.

Figure 2:
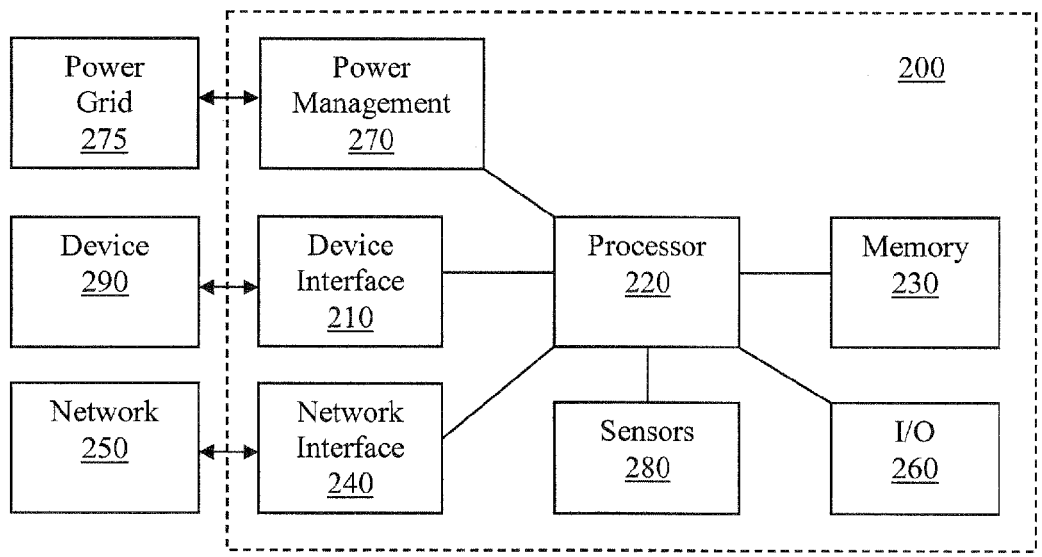
FIG. 2 depicts an example of an apparatus configured to monitor and/or manage power usage.

FIG. 2 depicts an example of an apparatus 200 configured to monitor and/or manage power usage. Apparatus 200 may comprise a processing device 220 operatively coupled to a memory device 230, one or more sensors 280 (hereafter referred to as sensors 280), a network interface 240, a device interface 210, an input/output (I/O) device 260, a power management device 270, or any combination thereof.

Network interface 240 may comprise electronic circuits or programs configured to interface and/or communicate with a network 250, such as an electrical network, a wired network, a wireless network, or any combination thereof. Network interface 240 may be configured to provide one or more network connections. Network interface 240 also may be configured to interface with a mobile device, such as a smartphone. In one example, network 250 may be configured to operatively couple apparatus 200 to a plurality of controllers, such as first controller 10, second controller 20, and/or third controller 30 (depicted in FIG. 1).

Memory device 230 may be configured to store instructions associated with an application program. Processing device 220 may be configured to execute the stored instructions. Processing device 220 also may be configured to access memory device 230 to run, store, and/or archive one or more programs. Memory device 230 may comprise RAM, ROM, and/or other types of storage or memory devices.

Device interface 210 may be configured to communicate with a device 290 and/or provide operating power to device 290. Processing device 220 may be configured to monitor and/or manage power usage associated with one or more devices, such as device 290. In some examples, device 290 may comprise a control device and/or an electrical device. Processing device 220 additionally may be configured to receive and/or transmit input and/or commands via device interface 210 and/or network interface 250.

Power management device 270 may be configured to control and/or regulate power provided from a power grid 275 to apparatus 200 and/or to other apparatus operatively connected to power grid 275. Apparatus 200 may be operatively connected to power grid 275 via a power line and/or an electrical line. Power management device 270 may be configured to monitor and/or manage power usage associated with apparatus 200 and/or devices, such as device 290, operatively connected to apparatus 200. In some examples, processing device 220 may be configured to receive and/or transmit input and/or commands over power grid 275.

Sensors 280 may comprise one or more types of sensors, such as a radio frequency identification (RFID) sensor, a contactless sensor, a wireless sensor, other types of sensors, or any combination thereof. Sensors 280 may be configured to sense and/or identify information associated with a device, such as device 290, which may come into proximity with apparatus 200 and/or which may be operatively connected with apparatus 200. In one example, sensors 280 may be configured to sense and/or identify device 290. I/O device 260 may comprise one or more types of input and/or output devices, such as a transmitter, a receiver, a wireless communication device, a Bluetooth device, a radio device, a Wi-Fi device, other input and/or output devices, or any combination thereof.

Apparatus 200 may be configured to receive substantially real-time operational data associated with one or more devices, such as device 290. For example, one or more of device interface 210, network interface 240, sensors 280, or I/O device 260 may be configured to receive a power request associated with an electrical device. Apparatus 200 may be configured to determine an available power associated with an electrical circuit configured to provide power to a plurality of electrical devices. The available power may be stored in memory 230 and/or may be received via network interface 240. A power profile associated with the electrical device also may be received. Apparatus 200 may be configured to relate the power request to the electrical device based, at least in part, on the power profile.

Processing device 220 may be configured to compare the power request to the available power to determine a service availability. The power request may be compared with a plurality of power profiles that may be stored in memory 230. In one example, a particular electrical device may be identified based, at least in part, on a result of the comparing. Apparatus 200 may be configured to communicate the service availability to a control device for enabling operation of the electrical device. In some examples, service availability may be communicated via device interface 210 and/or via network interface 240.

Apparatus 200 may be configured to communicate with a plurality of control devices to determine a total power requirement for the plurality of electrical devices. Processing device 220 may be configured to compare the total power requirement with the available power. The available power may be associated with a maximum power rating of an electrical system, an electrical circuit, a circuit breaker, a fuse, a battery, a power system, or any combination thereof.

In some examples, apparatus 200 may be configured to selectively enable one or more of a plurality of electrical devices as a result of comparing the power request and/or the total power requirement with the available power. One or more of the plurality of electrical devices may be prioritized, and an electric device identified as being high priority may be selectively enabled before, or instead of, an electrical device identified as having a low priority. Similarly, one or more of the plurality of electrical devices, such as the electrical device identified as having a low profile may be selectively disabled.

In some examples, apparatus 200 may comprise a control device, an electrical outlet, a server, a circuit breaker, a fuse box, a power management device, or any combination thereof. For example, apparatus 200 may be located in a power supply associated with the electrical device and/or an electrical circuit.

Figure 3:
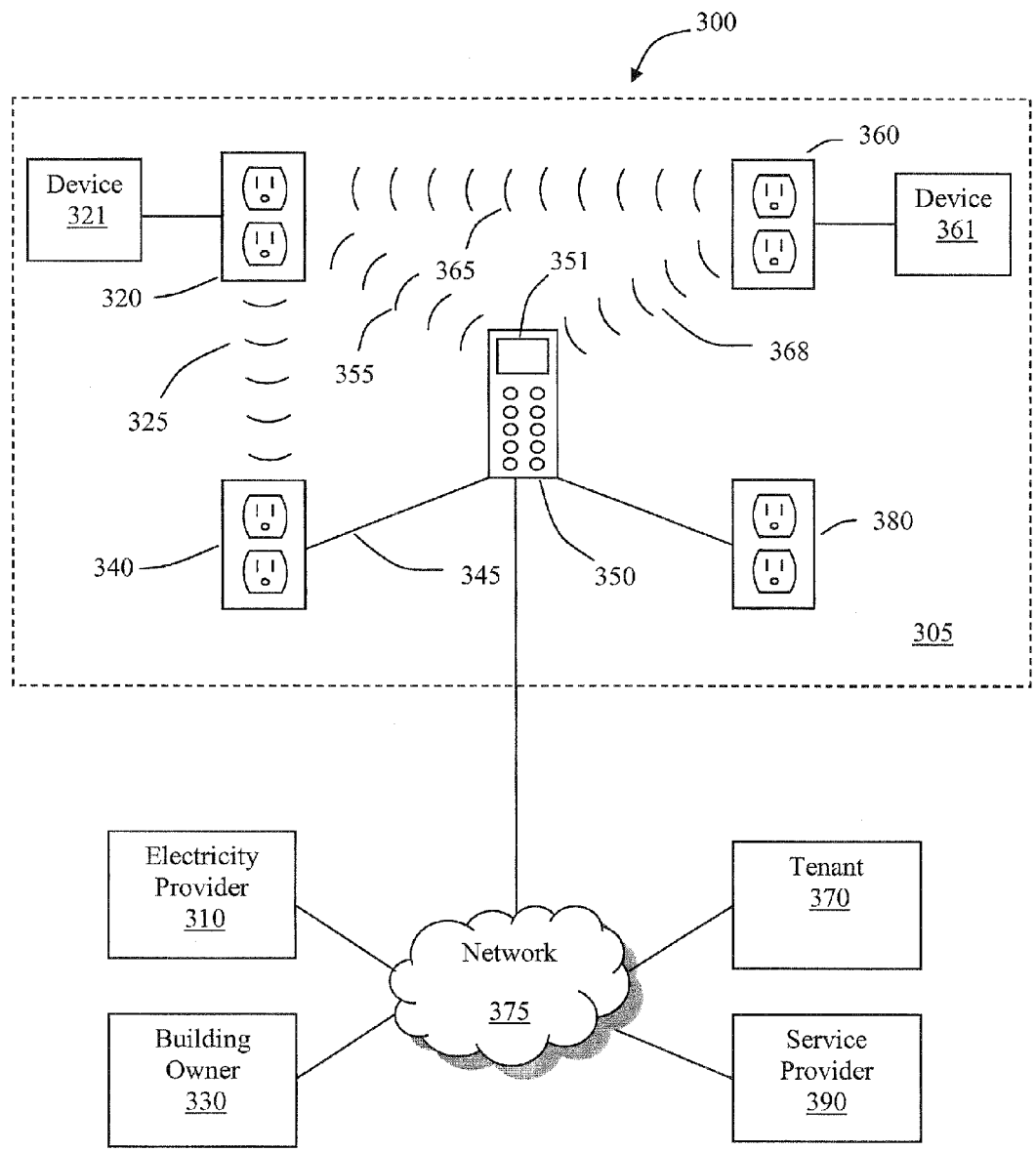
FIG. 3 depicts a further example of a system associated with monitoring and/or managing power usage.

FIG. 3 depicts a further example of a system 300 associated with monitoring and/or managing power usage. System 300 may comprise a network 375 operatively coupled to one or more users and/or service providers, such as an electricity provider 310, a building owner 330, a building tenant 370, a service provider 390, or any combination thereof. Additionally, network 375 may be operatively coupled to a power network 305. Power network 305 may comprise, and/or be associated with, an electrical circuit, a electrical power grid, an office building, a residential building, a power station, a battery recharging facility, electric vehicles, electric devices, or any combination thereof.

Network 375 may comprise a public network and/or a private network established for personal use, business use, governmental use, or any combination thereof. For example, network 375 may comprise a subscriber network, a cable network, a satellite network, a cellular network, a telephone network, a broadband network, a voice over Internet Protocol (VoIP) network, or any combination thereof. Furthermore, network 375 may comprise an electric network, a wired network, a wireless network, a local area network, a wide area network, a virtual network, or any combination thereof.

Power system 305 may comprise one or more devices, such as a first device 320, a second device 340, a third device 360, and/or a fourth device 380. The devices 320, 340, 360, 380 may comprise one or more control devices and/or electrical outlets. Additionally, power network 305 may comprise a central controller 350. Central controller 350 may comprise a processing device 351, and may be configured to receive and/or transmit information from/to one or more devices and/or service providers.

Central controller 350 may be operatively connected to one or more devices, such as first device 320 and/or third device 360, via a wireless communication system. For example, central controller 350 may be configured to wirelessly receive information from, and/or to wirelessly transmit information to, first device 320 and/or third device 360. Additionally, central controller 350 may be operatively connected to one or more devices, such as second device 340 and/or fourth device 380, via a wired communication system comprising one or more electrical wires, such as wire 345. One or more of the devices may be configured to transmit and/or receive information wirelessly, via a wire, via a cable, via a fiber optic, or any combination thereof.

Central controller 350 may be configured to remotely monitor operating conditions associated with the plurality of devices 320, 340, 360, and/or 380. In some examples, central controller 350 may be located in a place of business and/or a residence. Central controller 350 may comprise an electrical outlet, a server, a circuit breaker, a fuse box, a power management device, or any combination thereof.

When a device, such as first device 320, is being operated and/or is associated with a power request, central controller 350 may be configured to communicate with first device 320 and/or to transfer operational information over network 375. Central controller 350 may be configured to transfer the operational information in response to identifying a particular device that may be associated with the power request.

One or more of electricity provider 310, building owner 330, building tenant 370, and/or service provider 390 may be configured to receive and/or access the operational information via a computing device, such as a personal computer, a laptop, and/or a smart-phone that may be operatively connected to network 375. Power usage and/or capacity may be separately monitored for a building, a circuit, a room, an electrical outlet, a device, or any combination thereof. This information may be used for adjusting and/or setting individual user rates, for planning electrical grids and/or infrastructure, for providing other services, or any combination thereof.

In one example, first device 320 may be configured to identify and/or to receive a power request associated with an electrical device, such as a first electrical device 321. First device 320 may be configured to transmit the power request as a communication 325 to second device 340 and/or central controller 350. Additionally, first device 320 may be configured to receive a communication 365 from third device 360 and/or a communication 355 from central controller 350. Communication 365 may comprise operational information associated with a second electrical device, for example communication 365 may comprise a second power request and/or a power requirement associated with a second electrical device 361.

Central controller 350 may be configured to receive operational information associated with both first electrical device 321 and/or second electrical device 361. In response to receiving the operational information, central controller 350 may be configured to generate an operating instruction. In one example, central controller 350 may be configured to compare the requested power with a total available power and/or a rated power associated with power network 305. Communication 355 may comprise an operating instruction associated with enabling and/or disabling one or more electrical devices connected to power network 305.

Electricity provider 310, building owner 330, building tenant 370, and/or service provider 390 may monitor, control, and/or manage the power associated with power network 305. For example, one or more users and/or service providers may restrict energy consumption, charge varying rates for different levels of energy consumption, enable/disable electrical devices based on priority of energy usage, monitor energy usage history, enable/disable a power network, provide other services, or any combination thereof.

System 300, first controller 320, central controller 350, power network 305, electricity provider 310, building owner 330, building tenant 370, service provider 390, or any combination thereof, may be configured to perforin some or all of the operations described with reference to the examples described with reference to FIGS. 1 and 2, including first controller 10, server 40, processing device 220, apparatus 200, or any combination thereof.

Figure 4:
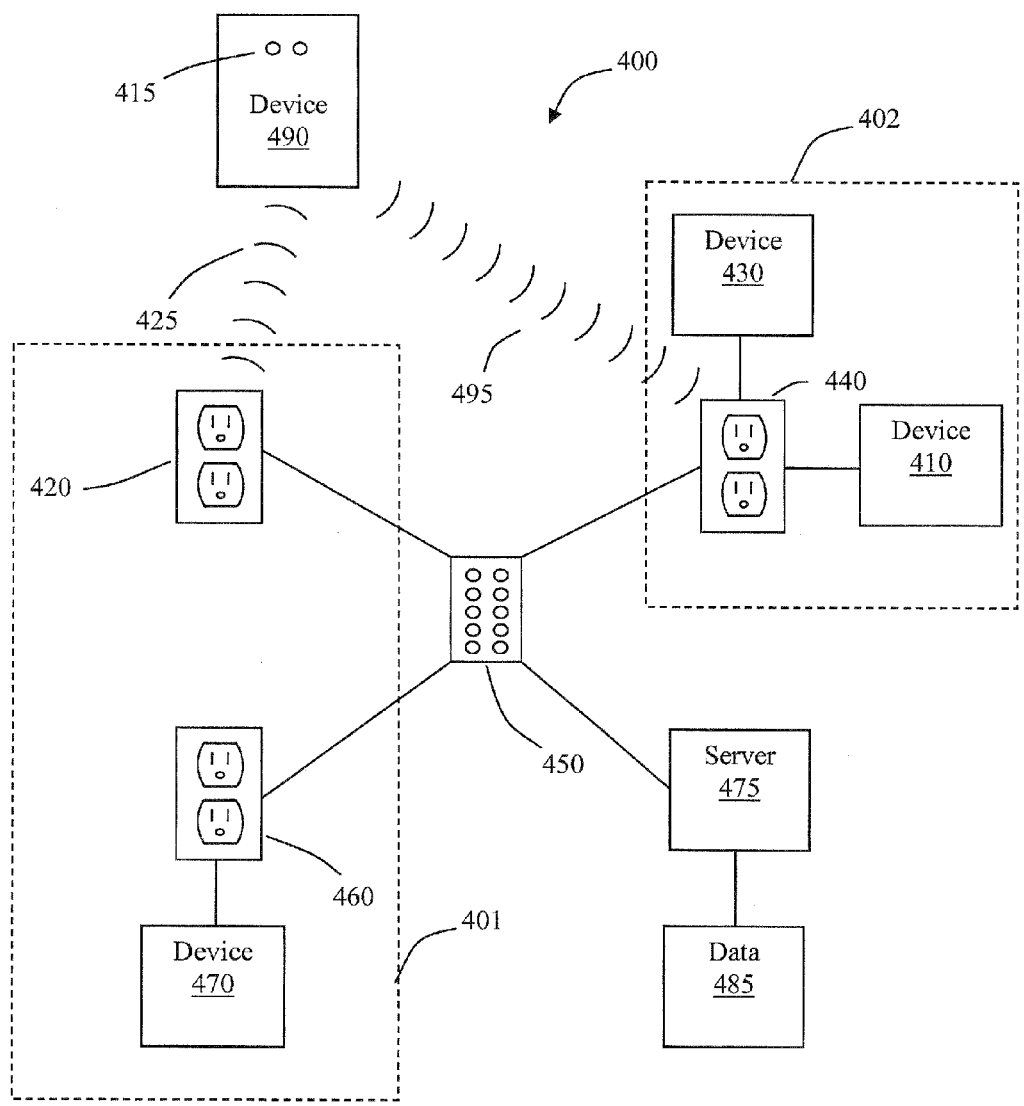
FIG. 4 depicts an example of a system configured to monitor and/or manage power usage.

FIG. 4 depicts an example of a system 400 configured to monitor and/or manage power usage. System 400 may comprise a circuit manager 450 operatively connected to one or more controllers, such as a first controller 420, a second controller 440, and/or a third controller 460. Circuit manager 450 may comprise, or be operatively connected with, a server 475 and/or a database 485. In one example, first controller 420 and/or third controller 460 may be associated with a first circuit 401, and second controller 440 may be associated with a second circuit 402. First circuit 401 and/or second circuit 402 may be associated with different rooms in a building and/or the same room.

Second controller 440 may be configured to provide power to one or more devices, such as a first device 410 and/or a second device 430. Similarly, first controller 420 and/or second controller 460 may be configured to provide power to one or more devices, such as a third device 470. First device 410, second device 430, and/or third device 470 may be associated with a first power profile, a second power profile, and a third power profile, respectively. In one example, system 400 may be configured to identify a fourth device 490 that comes into proximity of system 400 and/or that is operatively connected with system 400. Fourth device 470 may be associated with a fourth power profile.

The power profiles may be stored in first controller 420, in second controller 440, in circuit manager 450, in server 475, in database 485, or any combination thereof. In one example, system 400 may be configured to compare the power request with a plurality of power profiles, and to identify a type of device based, at least in part, on a result of the comparing. Database 485 additionally may be configured to store power rating, power usage, power history, safety thresholds, security, permissions, transaction functionality, information associated with one or more devices, or any combination thereof.

The identity of fourth device 490 may be transmitted in, or determined from, a communication 495. The identification of fourth device 490 and/or the identification of the fourth power profile may be determined in response to receiving communication 495. In one example, communication 495 may comprise the fourth power profile. The identification of fourth device 490 and/or the fourth power profile may be determined by first controller 420, second controller 440, circuit manager 450, server 475, or any combination thereof.

System 400 may be configured to receive a power request associated with a device, such as fourth device 490, proximately located near a control device, such as first controller 420. The power request may be received by first controller 420 and/or circuit manager 450. In some examples, first controller 420 may be configured to receive the power request from fourth device 490, circuit manager 450 may be configured to receive the power request from first controller 420 and/or server 475, server 475 may be configured to receive the power request from first controller 420 and/or circuit manager 450, or any combination thereof. System 400 additionally, or alternatively, may be configured to receive a power profile that relates the power request to the device.

In one example, circuit manager 450 and/or server 475 may be configured to receive an identification of fourth device 490 and to determine the power request and/or fourth power profile from a lookup table in database 485. The power request may be transmitted to circuit manager 450 and/or first controller 420.

System 400 may be configured to determine an available power associated with an electrical circuit, such as first circuit 401 and/or second circuit 402. First circuit 401 may be configured to provide power to a plurality of devices, such as third device 470. Second circuit 402 may be configured to provide power to a plurality of devices, such as first device 410 and second device 430. First circuit 401 may be associated with a first available power, and second circuit 402 may be associated with a second available power. The available power may be associated with a maximum power rating of a circuit breaker and/or fuse.

System 400 additionally may be configured to compare the power request to the available power to determine a service availability. The power request associated with fourth device 490 may be compared with the first available power and/or the second available power. In one example, system 400 may be configured to communicate with a plurality of control devices associated with a plurality of electrical outlets to determine a total power requirement for the plurality of devices, and to compare the total power requirement with the available power.

In response to one or more comparisons associated with the available power, system 400 may be configured to communicate a service availability to a controller for enabling operation of a device, for example fourth device 490. By way of illustration, the power request associated with fourth device 490 may be greater than the second available power associated with second circuit 402 and may be less than the first available power associated with first circuit 401. Accordingly, system 400 may be configured to communicate the service availability to first controller 420.

System 400 may be configured to selectively enable and/or disable the plurality of devices and/or controllers in response to determining that the power requirement exceeds the available power. For example, system 400 may disable and/or restrict fourth device 490 from drawing power from second circuit 402. System 400 may be configured to disable one or more controllers in response to determining that there are not any devices proximately located to a controller. Additionally, system 400 may be configured to enable a controller when a device becomes proximately located to, and/or becomes operatively connected with, the controller.

In one example, system 400 may be configured to selectively enable and/or disable one or more devices and/or one or more controllers based on varying levels of priority associated with a plurality of devices. For example, fourth device 490 may be associated with a high priority device, such as a defibrillator, and first device 410 may be associated with a relatively low priority device, such as a toaster. In response to determining that the power request associated with fourth device 490 may exceed the available power associated with second circuit 402, system 400 may be configured to disable first device 410 in order to increase the available power and provide the requested power to fourth device 490.

System 400 additionally may be configured to detect the presence and/or proximity of a device, such as fourth device 490, and/or to detect a service availability in response to detecting that the device is present. For example, fourth device 490 may comprise one or more lights 415 that are configured to be illuminated in the presence of a controller, such as first controller 420, which may be associated with available service. An illumination of a first light may indicate that there is sufficient power in the electrical circuit to accommodate the power request, and/or an illumination of a second light may indicate that there is insufficient power in the electrical circuit to accommodate the power request. In some example, first controller 420 may be configured to transmit a signal 425 to fourth device 490, and device 490 may be configured to illuminate one or more lights 415 in response to receiving signal 425.

The maximum available power associated with an electrical circuit may be varied according to a total power requested from one or more devices. For example, second circuit 402 may not have sufficient available power to satisfy a request for power from fourth device 490, whereas first circuit 401 may be associated with excess available power. Circuit manager 450 and/or server 475 may be configured to transfer and/or reroute the excess available power from first circuit 401 to second circuit 402, in order to balance the requested power with the available power. In some examples, a circuit manager associated with first circuit 401 may communicate the available power with another circuit manager associated with second circuit 402.

Figure 5:
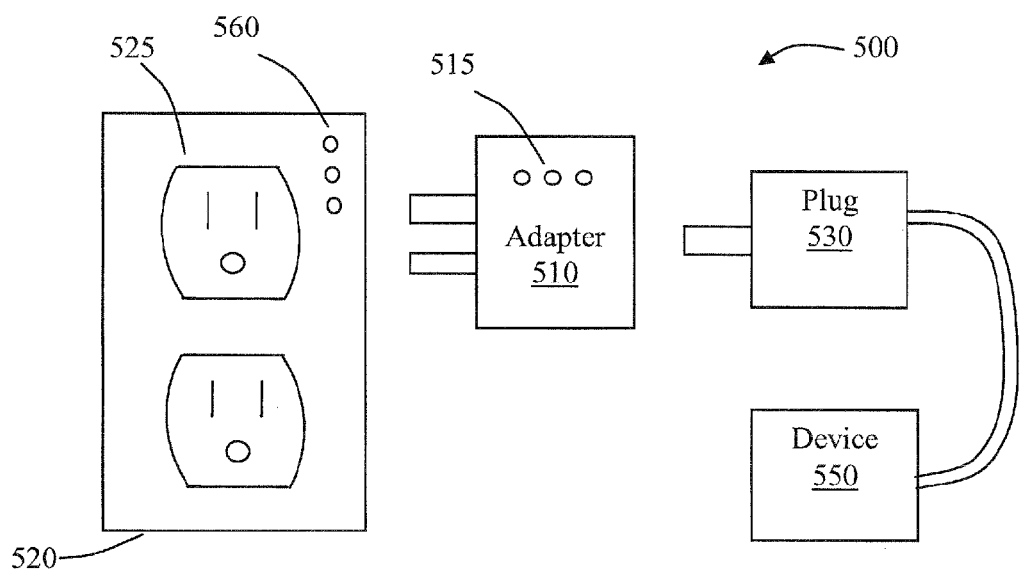
FIG. 5 depicts a further example of a system configured to monitor and/or manage power usage.

FIG. 5 depicts a further example of a system 500 configured to monitor and/or manage power usage. System 500 may comprise an intelligent adaptor 510 and/or an intelligent outlet 520. Intelligent adaptor 510 may be configured to operatively connect a device 550 with one or more electrical outlets, such as an electrical outlet 525. In one example, intelligent adaptor 510 may provide an electrical interface between device 550, and electrical outlet 525. Electricity provided by electrical outlet 525 may be transmitted to device 550 via intelligent adaptor 510. Device 550 may comprise an electrical plug 530 configured to connect device 550 to intelligent adaptor 510.

A first controller, such as intelligent adaptor 510, may be configured to identify a power requirement associated with an electrical device, such as device 550, and/or to communicate the power requirement to a second controller, such as intelligent outlet 520. Intelligent outlet 520 may be associated with an electrical circuit configured to provide power to a plurality of electrical devices, including device 550. Additionally, intelligent adaptor 510 may be configured to receive a response from intelligent outlet 520. The response may be configured to identify an available power associated with the electrical circuit In one example, intelligent adaptor 510 may be configured to enable operation of device 550 based, at least in part, on a comparison of the power requirement and the available power.

Intelligent adaptor 510 may comprise a first indicator system 515. Intelligent outlet 520 may comprise a second indicator system 560. One or both of first indicator system 515 and second indicator system 560 may be configured to indicate an availability of an electrical circuit to provide the power requirement to device 550. For example, second indicator system 560 may comprise one or more lights that may be configured to be illuminated in response to detecting a presence of device 550 and/or a presence of intelligent adaptor 510.

First indicator system 515 may also comprise one or more lights that may be configured to be illuminated based, at least in part, on a compatibility of the power requirement associated with device 550 and the available power associated with electrical outlet 525. The illumination of a first light may indicate that there is sufficient power in an electrical circuit to accommodate the power requirement, and/or an illumination of a second light may indicate that there is insufficient power in the electrical circuit to accommodate the power requirement. In some examples, one or both of first indicator system 515 and second indicator system 560 may comprise one or more audible tones instead of, or in addition to, lights.

First indicator system 515 and/or second indicator system 560 may be configured to indicate one or more compatible electrical circuits for device 550. For example, a first light may be illuminated on one or both indicator systems 515, 560 to indicate a compatible electrical circuit, and/or a second light may be illuminated to indicate an incompatible electrical circuit.

Additionally, first indicator system 515 and/or second indicator system 560 may be configured to indicate a load status and/or a power usage associated with one or more electrical circuits. For example, a first light may indicate a low load, a second light may indicate a medium load, and/or a third light may indicate a high load. The lights may be color coded, such as green, yellow and/or red to provide a visible indication as to the load status and/or the power usage associated with the one or more electrical circuits. In some examples, intelligent adaptor 510 may be configured to be operable with a compatible electrical outlet. The compatibility may be indicated by a similar color light, and/or intelligent adaptor 510 may be configured to be inoperable with an electrical outlet associated with a different color light.

Figure 6:
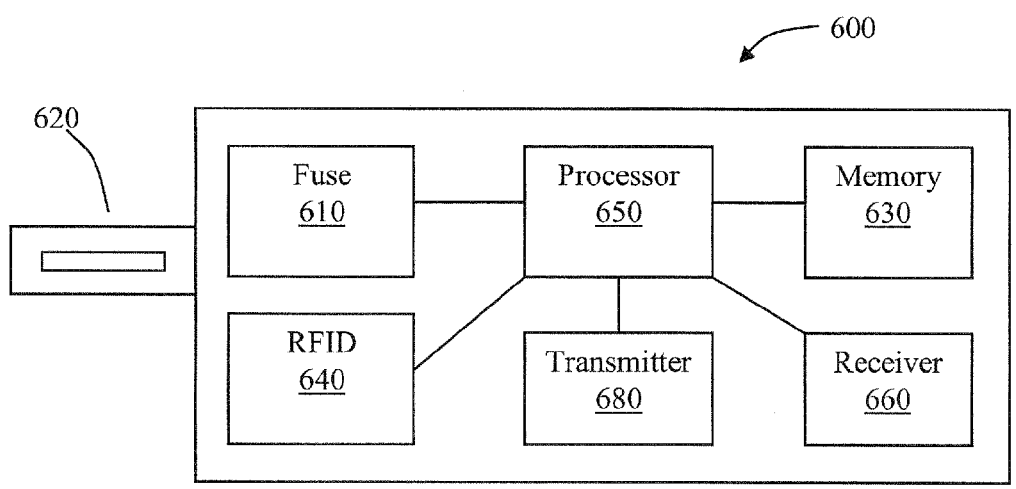
FIG. 6 depicts a further example of an apparatus configured to monitor and/or manage power usage.

FIG. 6 depicts a further example of an apparatus 600 configured to monitor and/or manage power usage. Apparatus 600 may comprise a processing device 650, a memory device 630, a receiver 660, a transmitter 680, a fuse 610, an RFID device 640, one or more electrical interfaces 620, or any combination thereof. In some examples, apparatus 600 may be located in, and/or associated with, an outlet, such as intelligent outlet 520 (FIG. 5), an adaptor, such as intelligent adaptor 510 (FIG. 5), an electrical plug, such as electrical plug 530 (FIG. 5), a device, such as device 550 (FIG. 5), a power cord, a power supply, a power convertor, or any combination thereof.

Memory device 630 may be configured to store instructions associated with an application program. Processing device 650 may be configured to execute the stored instructions. Processing device 650 also may be configured to access memory device 630 to run, store, and/or archive one or more programs. Memory device 630 may comprise RAM, ROM, and/or other types of storage or memory devices.

Electrical interfaces 620 may be configured to communicate with, and/or be connected to, one or more devices, adaptors, plugs, electrical outlets, or any combination thereof. Processing device 650 may be configured to monitor and/or manage power usage associated with one or more devices. Processing device 650 additionally may be configured to receive and/or transmit input and/or commands via receiver 660 and transmitter 680.

RFID device 640 may comprise an RFID chip and/or an RFID reader. RFID device 640 may be configured to sense and/or identify information associated with a device which comes into proximity with apparatus 600 and/or which is operatively connected with apparatus 600. In one example, RFID device 640 may be configured to indicate and/or provide an identity of apparatus 600. Transmitter 680 and/or receiver 660 may comprise a wireless communication device, a Bluetooth device, a Wi-Fi device, other input and/or output devices, or any combination thereof.

Transmitter 680 and/or receiver 660 may be configured to communicate with a plurality of controllers associated with a plurality of electrical outlets to determine a total power requirement for the plurality of electrical devices. Processing device 650 may be configured to compare the total power requirement with the available power.

In one example, apparatus 600 may be configured to determine and/or measure the power requirement during operation of an electrical device. Processing device 650 may be configured to compare the measured power requirement with a plurality of power profiles and/or to identify a type of the electrical device based, at least in part, on a result of the comparison. The power profile may be used to relate the power requirement to the identified electrical device. Transmitter 680 may be configured to transmit a power profile associated with the identified electrical device to a second controller.

Apparatus 600 may be configured to identify whether a power requirement is inconsistent with a power profile associated with an electrical device and/or to disable the electrical device in response to determining that the power requirement is inconsistent with the power profile associated with the electrical device. In one example, fuse 610 may be configured to open a circuit and/or disable a device, outlet, and/or adaptor in response to determining that the requirement may be inconsistent with, and/or exceed, the available power of the electrical circuit.

Additionally, apparatus 600 may be configured to determine when an electrical device may be performing inconsistent with a power usage history and/or a power rating, which may indicate that the electrical device is malfunctioning and/or defective. In one example, apparatus 600 may be configured to limit and/or to regulate an amount of power provided to the electrical device.

Apparatus 600 may be configured to monitor and/or identify a plurality of devices. Memory 630 may be configured to store a separate history associated with each of the plurality of devices. The history may be used to identify a particular device that is connected to apparatus 600.

Apparatus 600 may be configured to monitor the amount of power going through a particular power cord, and/or being provided to a particular device. Apparatus 600 may be configured to monitor a cumulative energy usage and/or an instantaneous power draw, and to predict a future power usage based on the power profile and/or history of power usage. In one example, Apparatus 600 may be embedded in a hair dryer, and may be configured to determine that the hair dryer may request 200 watts, 500 watts, or 1000 watts based on a user-selectable power control. Apparatus 600 may be configured to communicate and/or broadcast this information to one or more controllers and/or outlets, which may in turn be configured to respond to the request for power based on their own power load and state of operation.

Additionally, Apparatus 600 may be configured to monitor power usage relative to an initial setting of a device to determine if there may be a defect. For example, the device may be associated with a higher or lower current and/or voltage than normal due to a faulty connection. Apparatus 600 may be configured to alert the user and/or a manufacturer of the possible defect.

In the event of an emergency or possibly unsafe operating condition, apparatus 600 may be configured to change a setting of the device and/or disable the device. In some examples, the emergency may comprise a circuit overload and/or a power loss on the electrical grid. In response to the emergency, one or more controllers may be configured to selectively turn off certain devices, such as a coffee maker and/or a printer, but to continue providing power to selected devices such as lights and/or computers. Coordination of the controllers may be provided by a central power management system.

The power profile associated with a device may allow the adaptor to recognize the device the next time that it is connected to apparatus 600. When a new device is connected to the adaptor for the first time, apparatus 600 may be configured to provide a default system response. Additionally, apparatus 600 may be configured to modify the system response based on learned behavior of the new device. Information associated with the new device may be communicated throughout the system.

Figure 7:
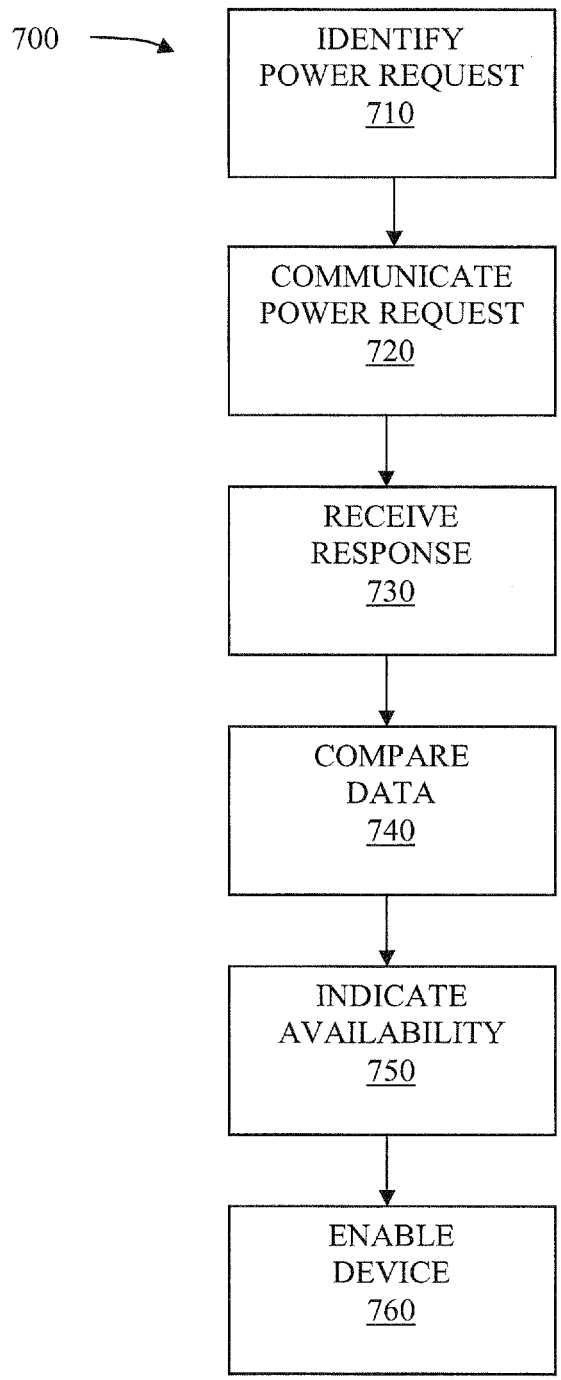
FIG. 7 depicts an example of a process for monitoring and/or managing power usage.

FIG. 7 depicts an example of a process 700 for monitoring and/or managing power usage. At operation 710, a power requirement associated with an electrical device proximately located near a first controller, may be identified. A device may be proximately located when it is sufficiently close to receive and/or transmit a wireless signal to another device, such as the first controller. Additionally, or alternatively, a device may be proximately located to another device when it is in the same room as the other device, in the same building as the other device, within a direct line of sight of the other device, within a predetermined distance of the other device, in contact with the other device, or any combination thereof. In one example, the electrical device may be operatively connected to the first controller.

The power requirement may be measured during operation of the electrical device. In one example, the measured power requirement may be compared with a plurality of power profiles, and the type of the electrical device may be determined based, at least in part, on a result of the comparing.

At operation 720, the power requirement may be communicated from the first controller to a second controller associated with an electrical circuit. The electrical circuit may be configured to provide power to a plurality of electrical devices including the electrical device. In one example, a power profile associated with the identified electrical device may be transmitted to the second controller. The power profile may relate the power requirement to the identified electrical device.

At operation 730, a response may be received from the second controller. The response may identify an available power associated with the electrical circuit. In some examples, one or both of the first controller and the second controller may be located in, or associated with, an electrical plug, an electrical device, an electrical adaptor, an electrical outlet, a circuit breaker box, a device associated with an electrical circuit, or any combination thereof.

At operation 740, the power requirement may be compared to the available power. In one example, an availability of the electrical circuit to provide the power requirement to the electrical device may be monitored. A plurality of controllers associated with a plurality of electrical outlets may be configured to communicate with each other to determine a total power requirement for a plurality of electrical devices. The total power requirement may be compared with the available power. The available power may be associated with a maximum power rating of a circuit breaker.

At operation 750, an availability of the electrical circuit to provide the requested power may be indicated. The availability of the electrical circuit may be indicated by one or more lights that are configured to be illuminated in response to detecting a presence of an electrical device. For example, the illumination of a first light may indicate that there is sufficient power in the electrical circuit to accommodate the power requirement. The illumination of a second light may indicate that there is insufficient power in the electrical circuit to accommodate the power requirement.

At operation 760, an operation of an electrical device may be enabled as a result of the comparing. For example, it may be determined whether the power requirement exceeds the available power, and the operation of one or more electrical devices may be selectively enabled and/or disabled as a result of the determining. In one example, a plurality of electrical devices may be selectively enabled and/or disabled based on varying levels of priority associated with the plurality of electrical devices.

The exemplary processes 700 depicted by FIG. 7, and the associated operations described therein, may be performed by one or more processing devices and/or systems, such as first controller 10, server 40, processing device 220, apparatus 200, system 300, system 400, system 500, processing device 650, and/or apparatus 600, as depicted by FIGS. 1-6, respectively.

Figure 8:
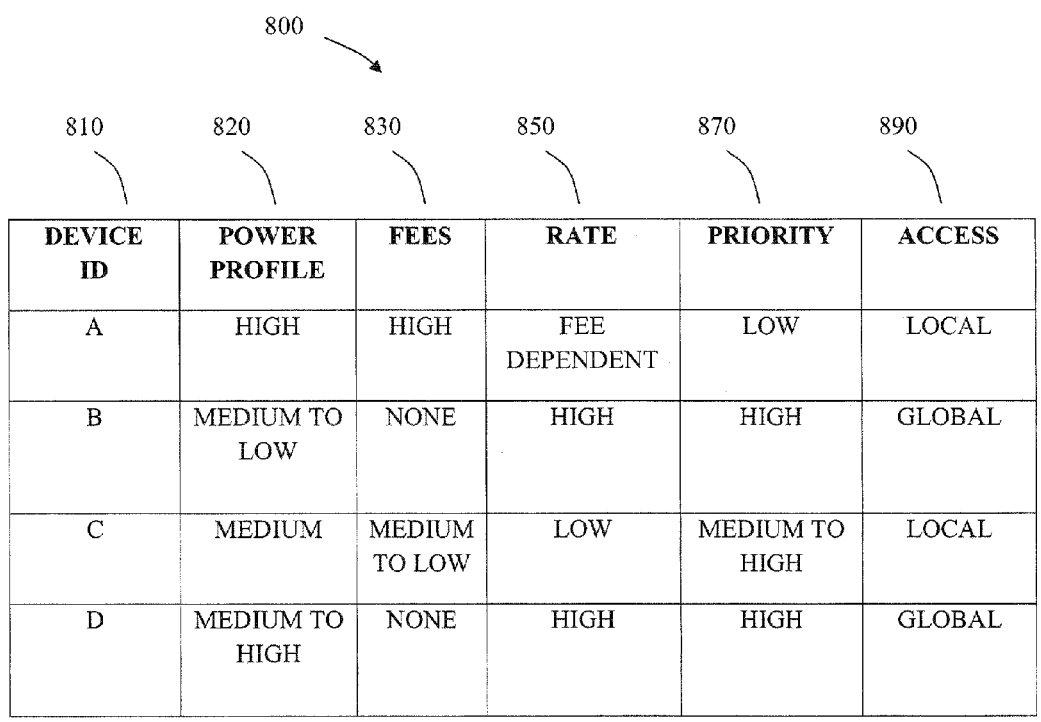
FIG. 8 depicts an example table comprising options for monitoring and/or managing power usage.

FIG. 8 depicts an example table 800 comprising options for monitoring and/or managing power usage. Table 800 may comprise one or more fields, such as a device identification 810, a power profile 820, a fee structure 830, an allowable charging rate 850, a priority 870, an access level 890, or any combination thereof. Example table 800 may be associated with a building, a place of business, a residence, an apartment complex, a neighborhood, a hospital, a particular room, a charging station, or any combination thereof.

Device identification 810 may comprise a type of device, a class of device, a characteristic of a device, a size of a device, a manufacturer of a device, a device model, a serial number, a Uniform Commercial Product Code (UPC), other information associated with a device and/or that may identify a device, or any combination thereof. For example, a device "A" may comprise a customer device, such as an electric car that may need recharging. A device "B" may comprise a service device, such as an electric lawnmower, that may be used to provide a service to a place of business and/or may be operated by the place of business. A device "C" may comprise a vendor device, such as an espresso cart, that may utilize electricity to provide services for customers and/or employees of the place of business. A device "D" may comprise an emergency device, such as a defibrillator, that may be used to provide services in the event of an emergency.

Power profile 820 may comprise a power rating, a history of power usage, a maximum power draw, a minimum power draw, an average power draw, a frequency of use, a duration of use, other information associated with device identification 810 and/or with a device, or any combination thereof. For example a "high" power profile may be associated with device A, a "medium" to "low" power profile may be associated with device B, a "medium" power profile may be associated, with device C, and/or a "medium" to "high" power profile may be associated with device D. Power profile 820 may be used to identify a particular device, and/or device identification 810 may be used to determine a particular power profile associated with a device.

Fee structure 830 may comprise one or more fee amounts, billing rates, and/or categories of payment associated with device identification 810 and/or power profile 820. For example, a "high" fee structure may be associated with device A, a "medium to low" fee structure may be associated with device C, and devices B and/or D may not be charged any fee for the utilization of power.

Allowable charging rate 850 may comprise one or more charging amounts, charging rates, and/or categories of charge rates associated with device identification 810 and/or power profile 820. For example, a variable charging rate may be associated with device A, and may vary depending on a selected fee structure. The allowable charging rate 850 may be greater for a "high" fee structure as compared to a "medium" and/or "low" fee structure. A "low" fee structure may be associated with device C, and a "high" and/or maximum charging rate may be associated with devices B and/or D. In some examples, a user may be able to select a "high" fee structure if a higher charging rate is desired.

Priority 870 may comprise one or more priorities and/or levels of importance associated with device identification 810 and/or power profile 820. For example a "low" priority may be associated with device A, a "medium" to "high" priority may be associated with device C, and/or a "high" or maximum priority may be associated with devices B and/or D. A device associated with a "medium" or "high" priority may be provided with access to power before, or in place of a device associated with a "low" priority.

Access level 890 may comprise one or more designations of access associated with device identification 810 and/or power profile 820. For example, a "local" access may be associated with devices A and/or C, and a "global" access may be associated with devices B and/or D. The "local" access may restrict access of a device to a particular electrical outlet, location, building, charging station, neighborhood, city, state, or any combination thereof. In one example, the "global" access may provide unlimited geographic access to power, which may be subject to fee structure 830.

The systems described herein may provide for the allocation and/or billing of power on a device-by-device basis. The systems may monitor the electrical outlets and/or devices and be configured to propose transactions based on the price and/or availability of electricity. User preferences for device usage may be negotiated and/or determined in advance via a user interface such as a smart phone. In some examples, the one or more controllers may be configured with preset times, amounts, and/or power limits that may restrict usage to certain operating conditions and/or situations.

In some examples described herein, one of more controllers may be associated with a number of electrical outlets, and another controller may be associated with a circuit breaker. A first controller associated with the electrical outlet may be configured to use power from the electrical circuit, however the first controller also may be configured to obtain power from a battery and/or a solar cell. The first controller may be configured to monitor a load going to that the electrical outlet. The first controller may be configured to communicate with a second controller wirelessly and/or through the power line of the electrical circuit itself. The first controller may be configured to determine the load of the overall electrical circuit based, at least in part, on the communication with the second controller. The second controller may be associated with the circuit breaker.

The second controller may be configured to monitor one or more other controllers associated with the number of electrical outlets, and/or to sum the total power usage by the one or more controllers. Additionally, the second controller may be configured to compare the total power usage with an available power of the circuit breaker and/or with a preset maximum power rating of the electrical circuit. In some examples, the second controller may be configured to communicate instructions to the one or more other controllers based, at least in part, on the comparison. The communications may comprise instructions to selectively enable and/or disable one or more devices and/or electrical outlets.

The system and apparatus described above may use dedicated processor systems, microcontrollers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device that may be configured to interface with a networked system, locally and/or remotely, via a wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variations coming within the spirit and scope of the following claims.

The invention claimed is:

1. An apparatus, comprising:
 a first controller located in an intelligent electrical outlet and configured to identify a power requirement associated with an electrical device;
 a transmitter configured to communicate a power request identifying the power requirement to a second controller, wherein the second controller operates in a network server and is associated with an electrical circuit configured to provide power to a plurality of electrical devices including the electrical device;
 a receiver configured to receive a response from the second controller, wherein the response comprises an operating instruction configured to direct the first controller to connect power to the electrical device based, at least in part, on a comparison of the power requirement and an available power associated with the electrical circuit; and
 an intelligent adaptor comprising a first plug configured to plug into the intelligent electrical outlet and a socket configured to receive a second plug from the electrical device, the intelligent electrical outlet being further configured to connect power from the intelligent electrical outlet to the electrical device based, at least in part, on the comparison of the power requirement and the available power associated with the electrical circuit,
 wherein at least one of the intelligent electrical outlet and the intelligent adapter further comprises plural color-coded power indicator lights configured to indicate compatibility of the available power associated with the electrical circuit to the power requirement of the electrical device and at least one of the indicator lights is configured to be illuminated in response to detecting a presence of the electrical device.

2. The apparatus of claim 1, wherein the first controller is further configured to receive the power requirement from the intelligent adaptor.

3. The apparatus of claim 1, wherein the first controller is further configured to:
 measure the power requirement during operation of the electrical device;
 compare the measured power requirement with a plurality of power profiles; and
 identify a type of the electrical device based, at least in part, on a result of the comparison.

4. The apparatus of claim 3, wherein the transmitter is further configured to transmit a power profile associated with the identified electrical device to the second controller, and wherein the power profile relates the power requirement to the identified electrical device.

5. The apparatus of claim 1, wherein the second controller is connected to a power management system associated with the electrical circuit.

6. The apparatus of claim 5, wherein the power management system comprises a circuit breaker, and wherein the available power is associated with a maximum power rating of the circuit breaker.

7. The apparatus of claim 1, wherein the transmitter is further configured to communicate with a plurality of other controllers associated with a plurality of electrical outlets to determine a total power requirement for the plurality of electrical devices, and wherein the first controller is further configured to compare the total power requirement with the available power.

8. A non-transitory memory device having instructions stored thereon that, in response to execution by a processing device, cause the processing device to perform operations comprising:
 detecting a presence of each of plural electrical devices;
 receiving power requests from a plurality of control devices associated with the electrical devices, the plurality of control devices each being located in one of a plurality of associated electrical outlets;
 determining an available power associated with an electrical circuit, wherein the electrical circuit is configured to provide power to the electrical devices;
 comparing the power requests to the available power to determine a service compatibility of the power requests with the available power; and
 sending operating instructions directing selected ones of the plurality of control devices to provide power to the associated electrical devices based on the service availability, wherein the processing device and the non-transitory memory device are located in an adaptor configured to plug into an electrical outlet; and
 indicating by plural color-coded power indicators on at least one of the electrical outlet and its adapter the presence of the electrical device and the service compatibility of the power request with the available power.

9. The memory device of claim 8, wherein the operations further comprise:
 comparing the power requests with a plurality of power profiles; and
 identifying types of the electrical devices based, at least in part, on a result of the comparing.

10. The memory device of claim 8, wherein the operations further comprise receiving power profiles associated with the electrical devices, and wherein the power profiles relate the power requests to the electrical devices.

11. The memory device of claim 8, wherein the operations further comprise:

determining that a total power requirement for the electrical devices exceeds the available power; and selectively enabling and disabling the electrical devices in response to determining that the total power requirement exceeds the available power.

12. The memory device of claim 11, wherein the electrical devices are selectively enabled and disabled based on varying levels of priority associated with the electrical devices.

13. The memory device of claim 8, wherein the processing device is operatively connected to a circuit breaker of the electrical circuit, and wherein the available power is associated with a maximum power rating of the circuit breaker.

14. An apparatus, comprising:

means for identifying a power request associated with an electrical device proximately located near a control device that is included in an electrical outlet;

means for determining an available power associated with an electrical circuit, wherein the electrical circuit is configured to provide power to a plurality of electrical devices including the electrical device;

means for comparing the power request to the available power to determine a service compatibility; and means for communicating an operating instruction configured to direct the control device to connect power to the electrical device based, at least in part, on the service compatibility, wherein the apparatus is located in an adapter configured to plug into the electrical outlet; and means for indicating by color-coding on at least one of the electrical outlet and its adapter the presence of the electrical device and the service compatibility of the electrical circuit for the electrical device.

15. The apparatus of claim 14, wherein the means for comparing comprises:

means for comparing the power request with a plurality of power profiles; and means for identifying the electrical device based, at least in part, on a result of the comparing.

16. The apparatus of claim 14, wherein the means for identifying comprises means for receiving a power profile associated with the electrical device, and wherein the power profile relates the power request to the electrical device.

17. The apparatus of claim 14, wherein the means for communicating comprises means for communicating with a plurality of other control devices included in a plurality of electrical outlets, respectively, to determine a total power requirement for the plurality of electrical devices, and wherein the means for comparing comprises means for comparing the total power requirement with the available power.

18. The apparatus of claim 17, further comprising means for selectively enabling the plurality of electrical devices as a result of the comparing.

19. The apparatus of claim 18, wherein the means for selectively enabling comprises means for prioritizing the electrical devices.

20. The apparatus of claim 18, wherein the means for selectively enabling comprises means for selectively disabling at least some of electrical devices identified as being low priority.

21. The apparatus of claim 14, wherein the power management system comprises a circuit breaker, and wherein the available power is associated with a maximum power rating of the circuit breaker.

22. The apparatus of claim 1, wherein both the intelligent electrical outlet and the intelligent adapter include the plural color-coded power indicator lights.

23. The apparatus of claim 14, wherein both the electrical outlet and the adapter include the means for indicating service availability.

\* \* \* \* \*